June 26, 1956   E. M. KANE   2,752,558
ELECTRIC TRANSDUCER
Filed April 22, 1953

*INVENTOR.*
ERNEST M. KANE
BY *Schmitt*
*Max Geldin*
*ATTORNEYS*

United States Patent Office 2,752,558
Patented June 26, 1956

2,752,558

ELECTRIC TRANSDUCER

Ernest M. Kane, Oxnard, Calif.

Application April 22, 1953, Serial No. 350,539

1 Claim. (Cl. 323—64)

(Granted under Title 35, U. S. Code (1952), sec. 266)

The invention described herein may be manufactured and used by or for the Government of the United States of America for governmental purposes without the payment of any royalties thereon or therefor.

This invention relates to electromechanical devices and more particularly concerns novel transducers for measuring a physical characteristic such as force, pressure, acceleration or mechanical movement, by electrical means.

Prior art devices for accomplishing this purpose have been constructed to utilize variations in inductive reactance, in capacitance or in resistance. One example of such a device is disclosed in U. S. Patent 2,244,958 to Moross, employing a comparatively fine resistance wire. Another prior art device of this general nature is disclosed in U. S. Patent 2,472,214 to Hurvitz, in the form of an electrically conductive flexible member such as sponge rubber having bubbles of air entrapped within its interstices. Changes in volume of this member in response to external pressure are accompanied by changes in internal resistance thereof and by changes in current flowing therethrough. These prior art devices, however, suffer from certain disadvantages including the necessity for using small currents, often involving the employment of cumbersome amplifying apparatus, high cost of the latter equipment, insufficient accuracy, and fragility.

One object of this invention is the provision of electromechanical devices adapted for use in measuring a physical characteristic (force, pressure, acceleration, and the like).

Another object is to provide a novel transducer which functions in accordance with variations in electrical conductance.

Still another aim of the invention is to afford a transducer having a minimum of working parts, and which is sturdy and comparatively accurate and reliable in operation.

Figure 1:
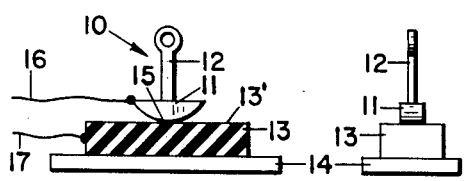
Figure 2:
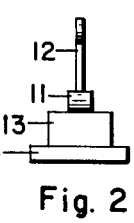
Figure 3:
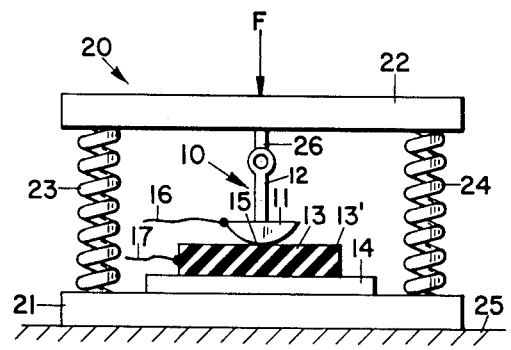
Figure 4:
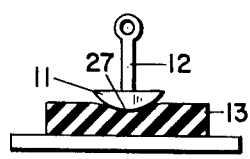
Figure 5:
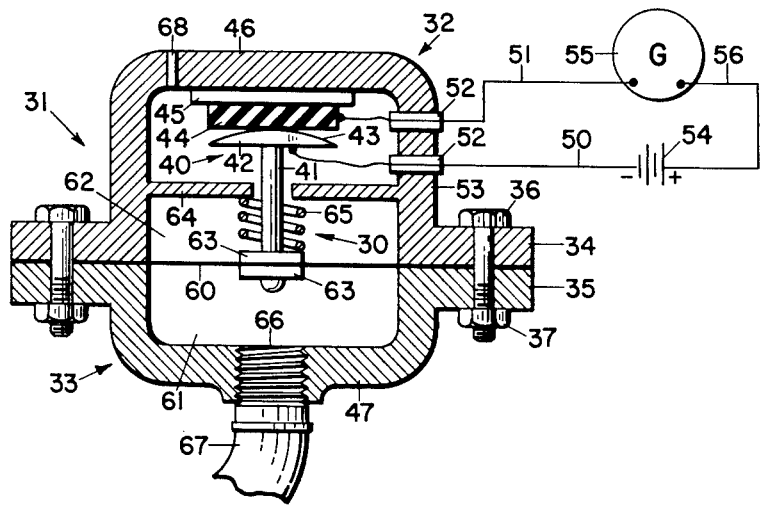
Figure 6:
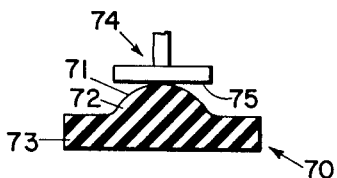
Figure 7:
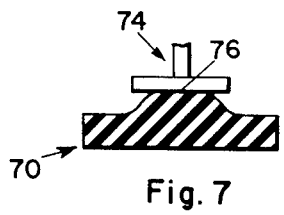
Figure 8:
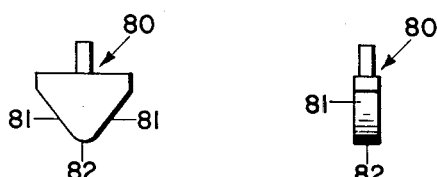
Figure 9:
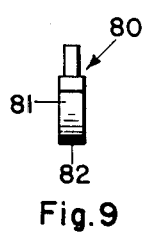

Other objects and many of the attendant advantages of this invention will be readily appreciated as the same becomes better understood by reference to the following detailed description when considered with the accompanying drawings wherein:

Fig. 1 is a front view of a device according to the invention, shown partly in section, Fig. 2 is a side view of the device of Fig. 1, Fig. 3 is a front view of a mechanism including the device of Fig. 1, Fig. 4 illustrates the device of Fig. 1 in operation, Fig. 5 is a partially sectional view of another mechanism including the device of Fig. 1, Fig. 6 represents a modification of the device of Fig. 1, Fig. 7 illustrates the modification of Fig. 6 in operation, Fig. 8 is a front view of another modification of the device of Fig. 1, and Fig. 9 is a side view of the modification of Fig. 8.

The foregoing objects and advantages are accomplished, in accordance with the invention, by provision of an electromechanical device which comprises two electrodes in contact with each other, at least one of the electrodes being formed of resilient conductive material and at least one of these electrodes having an arched or convex contacting surface. The electrodes are movable relative to each other, and are connected to a source of electrical energy. When a force corresponding to a physical characteristic to be measured is applied between the electrodes, the latter are urged toward and into closer engagement with each other to deform the resilient material of which at least one electrode is formed and to increase the area of contact between the electrodes, as more fully described hereinafter. This increases the electrical conductance across the electrodes and the current flowing in the circuit in proportion to the magnitude of the physical characteristic. The invention device is constructed so that a decrease or removal of the applied force causes the electrodes to be urged away from each other, diminishing the area of contact between the electrodes and the electrical conductance across them.

It is noted that the invention device operates upon the principle of varying conductance rather than on other circuit parameters such as resistance employed in prior art devices, enabling the characteristic to be measured or a change in magnitude thereof to be readily transformed into a proportional current in an external electrical circuit, employing an instrument in the circuit properly calibrated to measure such characteristic, or utilizing the current produced for any other desired purpose. The invention device is simple in construction, yet is comparatively sensitive and accurate.

Figs. 1 and 2 of the drawing illustrate one embodiment of the invention device. The transducer 10 shown in this figure consists essentially of a metal electrode 11 having a link member 12, in contact with the upper surface 13' of a second electrode 13 in the form of a conductive resilient or flexible material, preferably rubber, supported on an insulated base 14. The end portion or contacting surface of electrode 11 is cylindrically shaped as indicated by numeral 15. A pair of electrical leads 16 and 17 are attached to electrodes 11 and 13, respectively, for connection to a source of electrical energy (not shown) and a means of measuring or recording the quantity of current flowing (not shown).

Referring to Fig. 3 representing application of transducer 10 shown in Fig. 1 in a force measuring device, the transducer is mounted in a frame 20 consisting of bottom and top members 21 and 22, respectively, the top member being supported in spaced relation to the bottom member by means of springs 23 and 24. Base 14 and link member 12 of the transducer are suitably secured to bottom and top members 21 and 22, respectively, of the frame, link member 12 being attached through an insulating member 26 to the top 22. The bias on springs 23 and 24 is such that the transducer 10 is supported within frame 20 so that in the normal inoperative position, cylindrical surface 15 of electrode 11 just touches the upper surface 13' of the conductive, rubber electrode 13 without any substantial deformation thereof. The device is secured by suitable means (not shown) to a support member 25.

On the application of a force "F" against the top member 22, electrode 11, through link member 12, is urged in the direction of electrode 13 against the action of springs 23 and 24. Since electrode 13 is stationary and resilient, such action results in movement of electrode 11 against the contacting surface 13' of electrode 13, deforming this surface and increasing the area of contact 27 between it and cylindrical surface 15 of electrode 11, as illustrated in Fig. 4. Since the movement imparted to linkage 12 and electrode 11, and the resulting increase in area of contact between the two electrodes are proportional to the magnitude of the applied force "F," the increase in electrical conductance in the external circuit including leads 16 and 17 under these conditions is a criterion of the magnitude of such force.

When the applied force "F" is reduced, springs 23 and 24 urge linkage 12 and electrode 11 upward in a direction away from electrode 13 to reduce the area of contact between the two electrodes and the amount of current flowing across them, until upon sufficient reduction or removal of such force, electrode 11 is again in its original position with the curved contacting surface 15 thereof in touching engagement with electrode 13, and with the previously deformed surface 13' of the latter restored to its original horizontal shape.

In measuring very small forces, the springs 23 and 24 may be replaced simply by suitable guide members for guiding the movement of link member 12 and electrode 11 relative to electrode 13 on the application of a force, since the resilient, e. g. rubber, material of which electrode 13 is constructed may itself act as the spring to restore electrode 11 to its original position on reduction or removal of the applied force. The assembly of Fig. 3 may be employed as an accelerometer, if desired, by attaching a weight to the top member 22 and applying the force of acceleration upwardly from support member 25.

Fig. 5 represents another device employing the invention transducer. Numeral 30 represents a transducer according to the invention mounted within a housing 31 having an upper portion 32 and a lower portion 33, each of said portions having a pair of flanged end members 34 and 35, respectively, connected together by bolts 36 and nuts 37. Transducer 30 is similar to transducer 10 of Fig. 1, and comprises a metal electrode 40 having an elongated supporting member 41 connected to end portion 42, the outer surface 43 of which has a convex curvature. Surface 43 is in touching engagement with a second electrode 44 in the form of a conductive rubber element suitably connected to an insulating block 45 in turn attached to the top 46 of the upper portion 32 of the housing. It is seen that surface 43 of electrode 40 has considerably less curvature than surface 15 of electrode 11 of the transducer of Fig. 1, so that movements of electrode 40 toward electrode 44 result in proportionally greater areas of contact therebetween for a given increment in movement than in the case of the transducer of Figs. 1 to 4.

A pair of electrical leads 50 and 51 passing through insulators 52 in a side wall 53 of the housing connect electrodes 40 and 44 to a battery 54 and a galvanometer 55, respectively, the latter two elements being in turn connected to each other by means of a lead 56 to form a series circuit. A pressure sensitive diaphragm 60 is stretched across the inside of housing 31 and is secured between the opposing contacting surfaces of flanges 34 and 35, and held tightly in position by the aforementioned bolt and nut means. Diaphragm 60 separates the housing into two enclosed chambers 61 and 62. The elongated supporting member 41 of electrode 40 is attached to the center of diaphragm 60 by means of a pair of insulating members 63. Two guide members 64 suitably connected to the inside surface of the side walls of the housing each extend inwardly within the upper chamber 62 toward the center thereof, to a point closely adjacent elongated member 41 of electrode 40. Guide members 64 maintain electrode 40 properly aligned with electrode 44 during movement of the former with respect to the latter. A spring 65 is disposed around elongated member 41, abutting one of the insulating members 63 and the adjacent free ends of guide members 64. In normal inoperative position of transducer 30, the bias on spring 65 is such as to maintain surface 43 of electrode 40 simply in touching engagement with electrode 44, as shown in Fig. 5, and on decreasing or removing an applied pressure, the bias is such as to urge electrode 40 back to its original touching engagement with electrode 44. In the bottom 47 of the lower portion 33 of housing 31 is an inlet 66 for outside communication with lower chamber 61 of the housing, to which a source of pressure to be measured, is adapted to be connected, e. g. by means of a hose 67. A breather hole 68 is located in the upper portion 32 of the housing for communication of the upper chamber 62 thereof with the atmosphere to maintain the pressure in the upper chamber at about atmospheric at all times.

In operation of the device of Fig. 5, fluid pressure is transmitted through hose 67 into the lower chamber 61 of housing 31, urging diaphragm 60 and the attached metal electrode 40 upwardly toward electrode 44 against the action of spring 65. As in the case of the transducer of Figs. 1 to 4, such action forces convex surface 43 of electrode 40 into the resilient rubber material of which electrode 44 is constructed, deforming the surface thereof in a manner similar to that shown in Fig. 4, to increase the area of contact between surface 43 of electrode 40 and the lower contacting surface of electrode 44. This results in a corresponding increase in the electrical conductance of the circuit formed by leads 50, 51 and 56, and the corresponding current increase is indicated by galvanometer 55. The latter may be calibrated to read directly in terms of pressure values. When the pressure against diaphragm 60 is diminished or released, electrode 40 is urged downwardly by the action of spring 65, to decrease the area of contact between the two electrodes and restore the deformed surface of electrode 44 to its original shape, thus decreasing the amount of current flowing in the external circuit corresponding to the pressure decrease. Diaphragm 60 also aids, along with spring 65, to restore movable electrode 40 to its original position shown in Fig. 5. Where only small pressures are encountered, spring 65 may be omitted, as in the case of springs 23 and 24 of the device of Fig. 3, the resiliency of the rubber electrode 44 in conjunction with any spring action which diaphragm 60 may possess, acting to restore electrode 40 to its zero position on release of the applied pressure.

The device of Fig. 5 may be modified, if desired, by replacing pressure sensitive diaphragm 60 with a bellows, or with a cylinder and piston arrangement for measurement of pressures applied thereto. If the device of Fig. 5 is to be used to measure pressure differentials, the lower pressure is applied to upper chamber 62 through breather hole 68, and the higher pressure to lower chamber 61. The lower pressure can be applied in the form of dry gas pressure or oil pressure, employing an oil which does not attack the material of electrode 44. It is understood, of course, that an electrically conductive fluid such as mercury or impure water must not be introduced into the upper chamber of the device.

Instead of the metallic electrode of the invention transducer having an arched or convex contacting surface and the resilient conductive electrode having a planar contacting surface, as shown in the embodiments of Figs. 1 to 5, the resilient electrode 70, as seen in Fig. 6, may possess an arched contacting surface 71 formed by molding a properly shaped portion 72 of resilient material onto the surface of the main body 73 of the electrode, and the metallic electrode 74 may possess a flat contacting surface 75. According to this latter embodiment, on movement of electrode 74 downward against the arched or convex surface 71 of electrode 70 in response to an applied force, the latter surface tends to flatten out against the corresponding flat surface 75 of metallic electrode 74, as shown at 76 in Fig. 7, thereby increasing the area of contact between these electrodes and the electrical conductance thereacross.

The arched surface of electrodes 11, 40 and 70 of the devices of Figs. 1, 5 and 6, respectively, are preferably of a convex continuous curvature to obtain best results and minimum wear of the contacting surface of the resilient conductive electrode. In place of the substantially cylindrically shaped surface of the above noted electrode 11, 40 and 70, there may be employed contacting surfaces which are spherically shaped. However, arched or convex surfaces having other shapes may also be utilized in the invention device, for example an electrode 80, as shown in Figs. 8 and 9 having a contact surface consisting of two straight portions 81 sloping downwardly toward each other and a small rounded portion 82 connecting the straight portions at their lower extremities. Further, if desired, both of the electrodes of the transducer device of the invention may have contacting surfaces of an arched convex curvature.

The resilient or deformable conductive material forming at least one of the electrodes of the invention device may be any flexible material which has, or has been treated to possess, the property of conducting an electric current. An example of such a material is rubber compounded with acetylene black. Natural or synthetic flexible resins treated to make them electrically conductive may likewise be utilized in the invention. The degree of flexibility of the resilient material can be suitably varied for application in the invention transducer, that is, for example, a comparatively hard conductive rubber can be utilized where large forces are encountered, whereas a relatively soft conductive rubber material may be employed where it is to be subjected only to small forces. If desired, both of the electrodes of the invention device, rather than just one, may be constructed of resilient conductive material.

It is necessary according to the invention that at least one of the two electrodes of the transducer described herein be movable relative to the other. While in the transducer devices of Figs. 1 to 7 the conductive resilient electrode is stationary and the metallic electrode is movable, it is to be understood that both electrodes may be mounted for movement toward and away from each other, or the metallic electrode made stationary and the resilient conductive electrode mounted for movement relative thereto.

From the foregoing, it is seen that the invention provides a novel electromechanical device or transducer which is simple in structure, accurate and reliable in operation and functions on the principle of variations in conductance rather than on other electrical parameters such as resistance. As described, the invention device acts as a displacement measuring instrument, any relative movement of the contacting electrodes causing a change in the contact area between them and a corresponding variation in electrical conductance in the external circuit. This enables measurement or detection for any desired use, of the magnitude or change therein of a physical characteristic such as force, pressure or acceleration, which is transformed into a force causing the movement or displacement which is measured by the invention device.

Obviously many modifications and variations of the present invention are possible in the light of the above teachings. It is therefore to be understood that within the scope of the appended claim the invention may be practiced otherwise than as specifically described.

I claim:

A transducer which comprises a first electrode having an end portion in the shape of a convex surface, a second electrode formed of resilient conductive material having an essentially flat surface, the convex surface of said first electrode being partially in contact with the essentially flat surface of said second electrode, electrical leads directly connecting said electrodes with a source of electrical energy, said electrodes being mounted for movement relative to each other, means for transforming a physical characteristic to be measured into a force for urging said electrodes toward and into closer engagement with each other, and spring means for restoring said electrodes to their original position upon removal of said force.

References Cited in the file of this patent
UNITED STATES PATENTS

| | | |
|---|---|---|
| 1,448,681 | Stoekle | Mar. 13, 1923 |
| 1,972,578 | Wallocks | Sept. 4, 1934 |
| 2,472,214 | Hurwitz | June 7, 1949 |